United States Patent
Logan et al.

(10) Patent No.: US 6,996,402 B2
(45) Date of Patent: Feb. 7, 2006

(54) RULES BASED METHODS AND APPARATUS FOR GENERATING NOTIFICATION MESSAGES BASED ON THE PROXIMITY OF ELECTRONIC DEVICES TO ONE ANOTHER

(76) Inventors: James D. Logan, 23 Currier Rd., Candia, NH (US) 03034; Brian Logan, 40 Greenwood Dr., Monroe, CT (US) 06468

( * ) Notice: Subject to any disclaimer, the term of this patent is extended or adjusted under 35 U.S.C. 154(b) by 280 days.

(21) Appl. No.: 10/680,643

(22) Filed: Oct. 7, 2003

(65) Prior Publication Data
US 2005/0054290 A1 Mar. 10, 2005

Related U.S. Application Data

(63) Continuation-in-part of application No. 10/160,711, filed on May 31, 2002, now Pat. No. 6,788,766, and a continuation-in-part of application No. 09/651,542, filed on Aug. 29, 2000, now Pat. No. 6,631,271.

(51) Int. Cl.
*H04Q 7/20* (2006.01)
(52) U.S. Cl. .............. 455/456.1; 455/41.2; 455/457; 340/10.2; 340/572.1
(58) Field of Classification Search .. 455/456.1–456.6, 455/404.2, 41.1–41.2, 418, 457, 550.1, 9, 455/90.1; 340/10.2, 572.1, 539.27
See application file for complete search history.

(56) References Cited

U.S. PATENT DOCUMENTS

| | | | | |
|---|---|---|---|---|
| 4,217,588 A | * | 8/1980 | Freeny, Jr. | 455/456.6 |
| 4,476,469 A | * | 10/1984 | Lander | 340/539.1 |
| 4,881,179 A | * | 11/1989 | Vincent | 358/1.14 |
| 5,602,982 A | * | 2/1997 | Judd et al. | 715/709 |
| 5,623,404 A | * | 4/1997 | Collins et al. | 705/9 |
| 5,812,131 A | * | 9/1998 | Bertram | 345/905 |
| 5,881,377 A | * | 3/1999 | Giel et al. | 455/574 |
| 5,920,287 A | * | 7/1999 | Belcher et al. | 342/450 |
| 5,929,848 A | * | 7/1999 | Albukerk et al. | 455/41.1 |
| 6,088,593 A | * | 7/2000 | Dent | 455/456.1 |
| 6,259,367 B1 | * | 7/2001 | Klein | 340/572.1 |
| 6,324,211 B1 | * | 11/2001 | Ovard et al. | 375/219 |
| 6,493,550 B1 | * | 12/2002 | Raith | 455/456.1 |
| 6,611,673 B1 | * | 8/2003 | Bayley et al. | 340/10.3 |
| 6,631,271 B1 | * | 10/2003 | Logan | 455/456.1 |
| 6,714,797 B1 | * | 3/2004 | Rautila | 455/41.2 |
| 6,748,195 B1 | * | 6/2004 | Phillips | 455/41.2 |

(Continued)

*Primary Examiner*—Joseph Feild
*Assistant Examiner*—Kamran Afshar
(74) *Attorney, Agent, or Firm*—Charles G. Call (57) ABSTRACT

Methods and apparatus for performing specified actions when the relative position of specified objects satisfies conditions specified by a user and expressed in one or more rules. Each of the rules contains a condition part and an action part. The condition part of each rules specifies one or more conditions that are satisfied when specified objects move into or out of a predetermined range of one another. Each rule further contains an action part which specifies a function to be performed when the condition part of the rule is satisfied. The relative positions of objects are determined by an electronic interrogation device which can determine the identity of other electronic devices that are within range of the interrogation device. The electronic interrogation devices and the identification devices may be implemented using Bluetooth compliant devices, RFID tags and tag readers, or GPS devices.

21 Claims, 3 Drawing Sheets

U.S. PATENT DOCUMENTS

| | | | |
|---|---|---|---|
| 6,788,766 B2 * | 9/2004 | Logan | 379/67.1 |
| 6,795,017 B1 * | 9/2004 | Puranik et al. | 342/357.07 |
| 6,888,811 B2 * | 5/2005 | Eaton et al. | 455/404.2 |
| 6,898,434 B2 * | 5/2005 | Pradhan et al. | 455/456.1 |
| 2002/0102974 A1 * | 8/2002 | Raith | 455/41 |
| 2003/0104782 A1 * | 6/2003 | Wong et al. | 455/41 |

* cited by examiner

RULES BASED METHODS AND APPARATUS FOR GENERATING NOTIFICATION MESSAGES BASED ON THE PROXIMITY OF ELECTRONIC DEVICES TO ONE ANOTHER

CROSS REFERENCE TO RELATED APPLICATIONS

This application is a continuation in part of U.S. patent application Ser. No. 09/651,542 filed Aug. 29, 2000 which is to issue as U.S. Pat. No. 6,631,271 on Oct. 7, 2003 and U.S. patent application Ser. No. 10/160,711 filed on May 31, 2002 and published on Dec. 5, 2002 as U.S. patent application No. 6,788,766, the disclosures of which are hereby incorporated herein by reference.

FIELD OF THE INVENTION

This invention relates to methods and apparatus for generating alarm or notification signals in response to the changing relative locations of electronic devices.

BACKGROUND OF THE INVENTION

People are growing increasingly dependent on portable electronic devices such a cellular phones, personal computers, digital assistants, car locking controls, electronic watches, calculators, digital cameras, and the like. Because these devices are usually small, they are easily misplaced or forgotten, and because access to these devices is often essential, it is desirable to provide methods and apparatus for insuring that these devices are available when they are needed.

The functionality of both portable and fixed electronic devices is expected to be dramatically extended and improved by the advent of improved short range wireless connectivity provided by Bluetooth™ radio transmitters which are being incorporated into new electronic devices. The Bluetooth radio is built into a small microchip and operates within a globally available frequency band. The Bluetooth specification defines two power levels: a lower power mode with a range of about 10 meters for covering a personal area within a room, and a higher power level with a range of about 100 meters covering a larger area, such as a home or office. Software controls and identity coding built into each microchip ensure that only those units preset by their owners can communicate, and provide a mechanism for identifying other devices that are within range. As discussed below, this new technology may also be used to insure that needed devices are available when they are needed, and to provide related functions.

Other systems can be used to identify particular objects that are within a predetermined range of other objects. For example, identification tags which can be detected at short range are used in electronic article surveillance systems to prevent shoplifting and theft, warehousing and inventory control systems, article processing and inspection systems, and the like. To provide standards for one important class of identification tags, the EPC (Electronic Product Code) has been proposed to as a standard way of designating products, and packaging for products, in a range of retail supply chain application from "backroom" applications such as pallet and carton tracking to "selling floor" applications such as item level tagging.

SUMMARY OF THE INVENTION

In its preferred embodiment, the present invention takes the form of methods and apparatus for performing one or more specified functions in response to the changing relative positions of a plurality of objects. An electronic device that can be identified at short range is attached to or forms a part of each of the objects.

One or more processing rules are defined by a user. Each of the rules contains condition part and an action part, with the condition part defining at least one relative position condition to be satisfied by specified ones of said objects and the action part defining at least one specified action to be performed when said condition part is satisfied.

One or more detectors genera data indicating the identification and relative position of electronic devices that are within range of the detectors. This data is processed in accordance with the processing rules defined by the user, and functions are performed as specified in the action part of each of the rules whose condition part is satisfied by the data from the detector(s).

The detectors operate as interrogation devices capable of determining whether said specified ones of said objects are within a predetermined range of said interrogation device, and may be implemented by Bluetooth compliant integrated circuits, by radio frequency identification (RFID) tag readers, or by devices which obtain position information from devices using the Global Positioning System (GPS).

The action part of a user-defined rule may specify the content and destination of a message to be delivered when said condition or conditions specified in the action part is satisfied.

One of the objects may be a container which holds one or more objects, and the condition part of a rule may define one or more relative position conditions to be satisfied by the position of the container relative to said one or more objects specified in the rule. An identification token, such as a card or a badge, may be issued to a designated bearer and the condition part of a rule may define a position condition to be satisfied by the position of said identification token relative to one or more other devices.

The methods and apparatus contemplated by the invention may be used to advantage in a wide range of programmable applications defined using a standard user interface which a user employs to define the condition and action parts of rules which control a variety of defined functions in response to the changing relative positions of specific objects identified in the rules.

These and other objects, features and advantages of the present invention may be better understood by considering the following detailed description of specific embodiments of the invention. In the course of this description, frequent reference will be made to the attached drawings.

DETAILED DESCRIPTION

Figure 1:
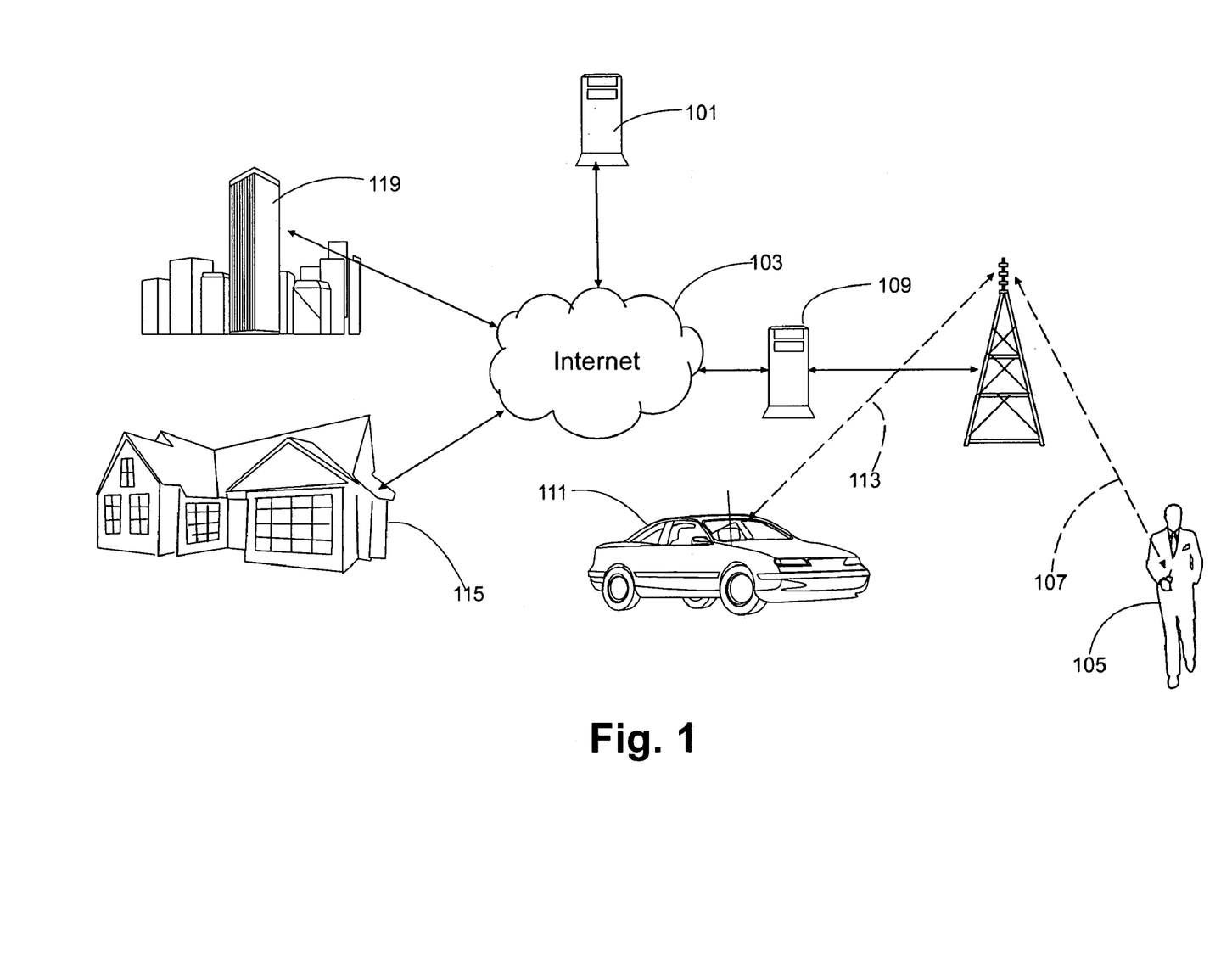
FIG. 1 is a schematic view illustrating a network of electronic devices which utilize the present invention.

As contemplated by the present invention, a the relative locations of a network of electronic devices, each including an electronic device whose absolute or relative position can be sensed, are monitored to generate notification signals in accordance with user-defined rules. An illustrative example of such a network is shown in FIG. 1. Supervisory functions for the system are executed on a server 101 which is connected via the Internet 103 to a plurality of different fixed and portable electronic devices which employ Bluetooth chips or other radio frequency devices to sense the relative location of devices in the network as well as provide connectivity between the devices.

For example, the user seen at 105 uses a hand held cellular phone which is connected to the Internet 103 using a Wireless Application Protocol (WAP) radio link 107 and a WAP gateway server 109. Similar, the user's automobile 111 employs a second WAP link 113 and the WAP gateway 109 to connect to the Internet. Additional electronic devices, such as personal computers, at the user's home 115 and office 119 are also connected to the Internet via conventional means, including dialup and fixed connections to Internet Service Providers (ISPs).

Each of the foregoing devices are thus provided with Internet connections and each is further provided with a Bluetooth chip which enables that device to communicate over short ranges to still further devices (not shown in FIG. 1). For example, the user 115 may carry additional devices, such as a laptop computer or a personal device assistant (PDA), an electronic wristwatch, a remote control for an automobile door lock, a digital camera, or an electronic calculator. Each of these devices may be equipped with a Bluetooth chip which can communicate with other devices, including the user's cellular phone which includes a Bluetooth chip that enables it to also operate as a short range intercom device and as a portable phone when it is the vicinity of a base station at the user's home 115 or office 119.

The user's automobile 111 is also equipped with a cellular phone system capable of establishing data communications via the WAP gateway 109 and the Internet 103 to provide information, entertainment, and communications services to the occupants. The automobile may be further provided with a navigation system using the Global Positioning System (GPS), a diagnostic system capable of generating, displaying and transmitting status information about the automobile, The automobile's car locking system may employ a Bluetooth enabled transceiver to remotely control door and truck locks, lights, and anti-theft alarms.

At the user's home 115 and at his or her office 199, Bluetooth enabled devices may be integrated into a variety of fixed systems, including thermostats, appliances, entertainment systems; lighting controls, security systems, and office equipment. Although the Bluetooth chips in these devices may be primarily intended for different functions, they can play a useful role in the position monitoring and notification system contemplated by the present invention, a described below.

The invention may be advantageously applied to business as well as consumer applications. For instance, an engineer who customarily takes instruments and tools into the field may use the system to prevent these devices from being misplaced or forgotten. By using the user-defined rules for monitoring the relative and absolute positions of various devices, in combination with user-defined actions which should be performed when associated conditions are satisfied, the system can be tailored to the needs of the particular user and the specific devices which that user owns and operates.

Bluetooth Functions

As described in Profiles, Specification Volume 2, Specification of the Bluetooth System, V1.0B, Dec. 1, 1999, under the Generic Access Profile, two devices involved in a Bluetooth communication can take the roles specified by the generic notation of the A-party (the paging device in case of link establishment, or initiator in case of another procedure on an established link) or the B-party (paged device or acceptor). The A-party is the one that, for a given procedure, initiates the establishment of the physical link or initiates a transaction on an existing link.

The Bluetooth access profile establishes the procedures between two devices related to discovery and connecting (link and connection establishment) for the case where none of the two devices has any link established as well as the case where (at least) one device has a link established (possibly to a third device) before starting the described procedure. The Bluetooth user should, in principle be able to connect a Bluetooth device to any other Bluetooth device. Even if the two connected devices don't share any common application, it should be possible for the user to find this out using basic Bluetooth capabilities.

Each Bluetooth device is specified by a unique 48-bit (12 hexadecimal digit) Bluetooth Device Address (BD_ADDR) and by a "user friendly" Bluetooth Device Name which can be up to 248 bytes long, although external devices are not expected to be able to handle or display more than 40 characters. Still further, each device is assigned a Bluetooth passkey (Bluetooth PIN) which is used to authenticate two Bluetooth devices (that have not previously exchanged link keys) to each other and create a trusted relationship between them. The PIN may be entered through a user interface device and may also be stored in the device; e.g. in the case of a device without sufficient capability for entering and displaying digits.

Bluetooth devices are further specified by a Class of device parameter received during the device discovery procedure and indicating the type of device and which types of service that are supported. The information within the Class of Device parameter is referred to as 'Bluetooth Device Class' (i.e. the major and minor device class fields) and 'Bluetooth Service Type' (i.e. the service class field). The terms for the defined Bluetooth Device Types and Bluetooth Service Types are defined in the specification. The Class of device is a bit field and, at the user interface level, the information in the Class of device is implementation specific.

Bluetooth devices are capable of performing an inquiry function to determine the identity and Device Class of other "discoverable" Bluetooth devices which are in range. With respect to inquiry, a Bluetooth device shall be either in non-discoverable mode or in a discoverable mode; that is, the device shall be in one, and only one, discoverability mode at a time. The two discoverable modes defined here are called limited discoverable mode and general discoverable mode. When a Bluetooth device is in non-discoverable mode it does not respond to inquiry. A Bluetooth device is said to be made discoverable, or set into a discoverable mode, when it is in limited discoverable mode or in general discoverable mode. Even when a Bluetooth device is made discoverable it may be unable to respond to inquiry due to other baseband activity. A Bluetooth device that does not respond to inquiry for any of these two reasons is called a silent device.

Bluetooth devices are capable of perform different types of inquiries called a (1) general inquiry, (2) limited inquiry, (3) name inquiry, (4) device discovery, and (5) bonding. The purpose of the general inquiry procedure is to provide the initiator with the Bluetooth device address, clock, Class of Device and used page scan mode of general discoverable devices (i.e. devices that are in range with regard to the initiator and are set to scan for inquiry messages with the General Inquiry Access Code). Also devices in limited discoverable mode will be discovered using general inquiry. The general inquiry is intended to be used by devices that need to discover devices that are made discoverable continuously or for no specific condition.

The purpose of the limited inquiry procedure is to provide the initiator with the Bluetooth device address, clock, Class of Device and used page scan mode of limited discoverable devices. The latter devices are devices that are in range with regard to the initiator, and may be set to scan for inquiry messages with the Limited Inquiry Access Code, in addition to scanning for inquiry messages with the General Inquiry Access Code. The limited inquiry is intended for use by devices that need to discover devices that are made discoverable only for a limited period of time, during temporary conditions or for a specific event.

The purpose of name discovery is to provide the initiator with the Bluetooth Device Name of connectable devices (i.e. devices in range that will respond to paging). A Name request is the procedure for retrieving the Bluetooth Device Name from a connectable Bluetooth device. It is not necessary to perform the full link establishment procedure) in order to just to get the name of another device. In the name request procedure, the initiator will use the Device Access Code of the remote device as retrieved immediately beforehand normally through an inquiry procedure.

The purpose of device discovery is to provide the initiator with the Bluetooth Address, clock, Class of Device, used page scan mode and Bluetooth device name of discoverable devices. During the device discovery procedure, first an inquiry (either general or limited) is performed, and then name discovery is done towards some or all of the devices that responded to the inquiry. The built-in ability of a Bluetooth device to detect the presence and identity of other Bluetooth devices which are within its range may be used to provide location information which is then used, as described below, to generate useful notification messages to the user.

Figure 2:
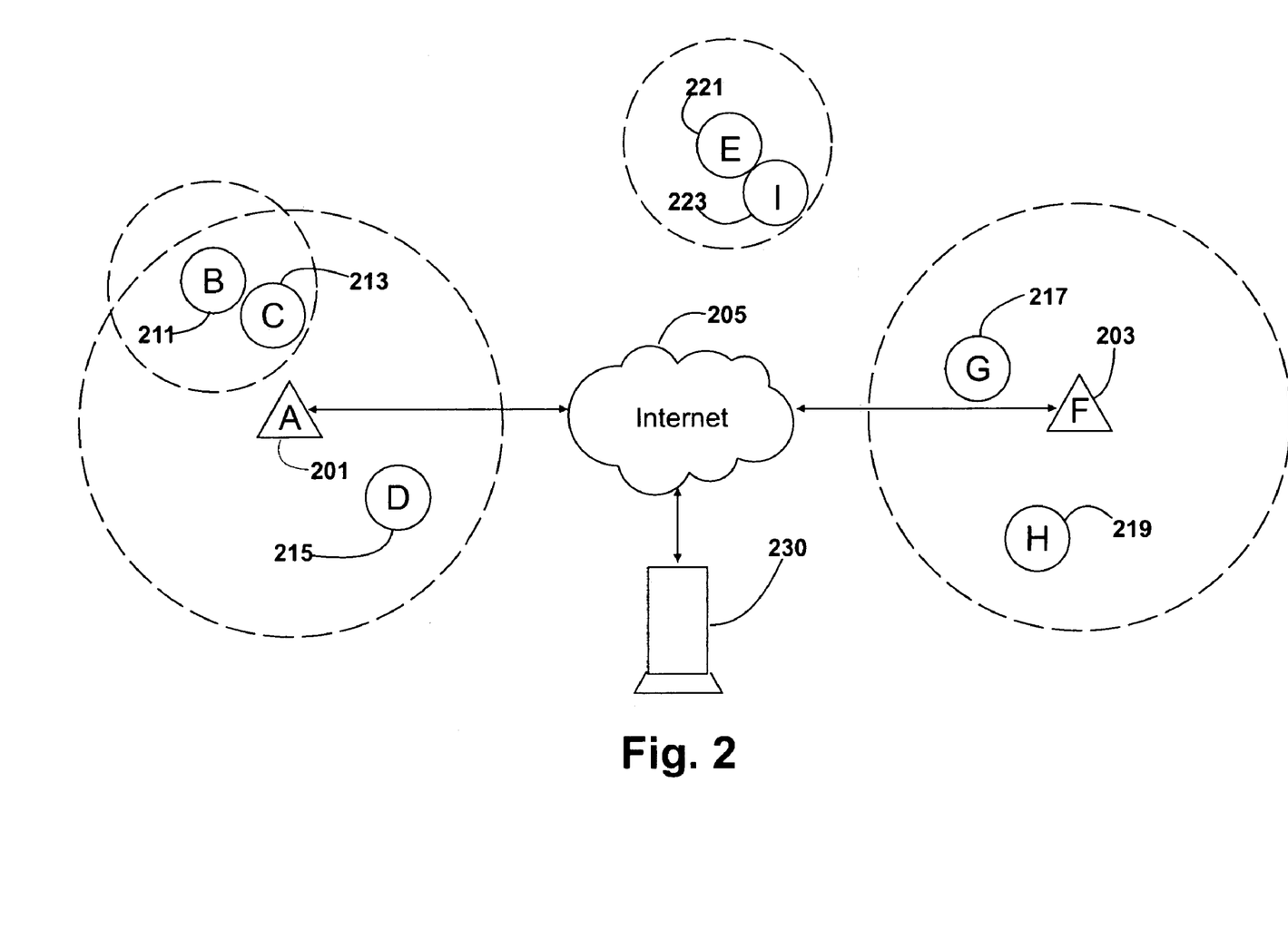
FIG. 2 illustrates the topology of a group of electronic devices as defined by ability of at least selected ones of the devices to identify other devices within its limited signaling range.

An illustrative topology is shown by way of example in FIG. 2. As there shown, two fixed Bluetooth devices illustrated by the triangles A and F at 201 and 203 are each linked to the Internet as seen at 205, and both can operate in a long range mode. Thus, the device illustrated by the triangle A at 201 can discover the presence of and communicate with the Bluetooth devices illustrate by the circles B, C and D at 211, 213 and 215 respectively. The device indicated by the circle B at 211 operating in short range mode can detect the nearby device C at 213, but the device D at 215 is out of range for the device B. The devices indicated by the circle G at 217 and by the circle H at 219 are both within the range of the device F at 203. The device indicated by the circle E at 221 is out of the range of both the devices A and F, but is near to and can discover the presence and identity of device I at 223.

Those Bluetooth device which are programmable (e.g. personal computers, PDAs, and the like) may be readily programmed to detect and report the position of nearby devices. Thus, the device A may be programmed to detect the fact that devices B, C and D are within its range, that devices E, F, G, H and I are outside its range, and that device C is also within the range of device B but that device D is not within the range of device B.

A server seen at 230 is connected to the Internet, and hence to devices A and F. The server 230 receives HTTP messages from the remote devices A and F containing the position information obtained by transmitting Bluetooth inquiry messages from devices A and F, and by gathering position information obtained from satellite Bluetooth devices, such as the device B.

The server 230 executes a supervisory program which records the position information contained in received messages to establish state information at predetermined times. By comparing the state information at different times, transition events can be detected. Thus, if device B moves outside the range of device A, the time at which that movement occurred can be determined.

Other Range and Position Detection Systems

Other systems can be used to identify when particular objects are within a predetermined range of other objects. For example, identification tags which can be detected at short range are used in electronic article surveillance systems to prevent shoplifting and theft, warehousing and inventory control systems, article processing and inspection systems, and the like. Such systems are available from Unisen of Boca Raton, Fla.; Detectag of Aurora, Ontario, Canada; and Sensormatic of Boca Raton, Fla. Using these range-sensing, tagging mechanisms in combination with the user-defined rules contemplated by the invention, the user can tag articles which should be, or should not be, in particular places at particular times, as defined by the condition part of user-specified rules.

There are several different kinds of radio frequency identification (RFID) technologies and tags, each of which has significantly different functional characteristics. Some tags have batteries, some don't. Some tags have short-read ranges, some have long-read ranges. Popular tags operate on at least six different frequencies, often with many competing protocols at each frequency. To provide standards for identification tags, the EPC (Electronic Product Code) has been proposed to as a standard way of designating products, and packaging for products, in a range of retail supply chain application from "backroom" applications such as pallet and carton tracking to "selling floor" applications such as item level tagging. At its most basic level, EPC is a coding scheme for RFID data that will identify an individual item's manufacturer, product category and unique serial number.

In addition to, or as an alternative to, the range finding abilities of a Bluetooth device, an article surveillance system, or the equivalent, an object whose position is to be tracked may incorporate a Global Positioning System (GPS) receiver for determining the absolute position in latitude and longitude for that device. For example, the GPS 25 series receivers available from Garmin Industries provide position information accurate to within 5 meters, velocity information accurate to 0.1 m/s RMS, are small in size (46.5 mm×69.9 mm×11.4 mm), and consume little power (115 mA typical @ 5.0 VDC). For details on the Global Positioning System and GPS receivers, see Understanding GPS: Principles and Applications by Elliott D. Kaplan (Editor), Artech House; ISBN 0890067937 (1996). Motorola offers the MG4100 Instant GPS chip that can detect GPS signals as low as −53 dBm, that can be readily added to virtually any portable consumer electronics product to provide position awareness. For example, digital cameras might stamp photos with time and location labels, PDAs can provide maps with real time navigation, and cellular phones that are E-911 compliant can offer emergency assistance, navigation, buddy finders, and location-based interconnections with others. Methods and apparatus for providing location dependent cellular telephone communications are further described in co-pending U.S. patent application Ser. No. 10/160,711 filed on May 31, 2002 and published on Dec. 5, 2002 as U.S. Patent Application Publication No. 2002/0181684 A1, the disclosure of which is incorporated herein by reference.

In addition, Mobile Positioning Systems (MPS) which are incorporated into cellular phone systems provide a mechanism for continuously or periodically updating location information for cell phones. MPS technology is similar to the satellite-based Global Positioning System (GPS) but offers the additional capability of determining location inside buildings, parking garages and other shielded areas such as inside a pocket or briefcase that are inaccessible to GPS systems. MPS Mobile Positioning Systems for GSM cellular phones are offered by Erickson and Cellpoint, Inc.

When a GPS or MPS device is used to determine absolute position, the user defined rules which determine when predetermined actions are performed may include absolute position requirements. For example, the GPS receiver in an automobile navigation system may be used to add a condition to the condition part of a rule which states "If my automobile is more than 2 miles from my house, and . . ."

Applications

In accordance with the invention, a rules-based system for monitoring the movement and relative location of a plurality of electronic devices, including Bluetooth compliant devices, RFID tags and RFID tag readers, and GPS devices, may be employed to perform specified actions, such as issuing notification messages and actuating alarms, when the conditions specified in one or more or the defined rules are satisfied. The RFID tag readers perform inquiry operations to identify RFID tags which are with range of the tag reader. The RFID tag readers may be connected in a network using the long-range communications capabilities of an included Bluetooth device, or via some other communication link. The positional data derived from these inquiries is passed to a rules processor which initiates defined actions when one or more of the rules are satisfied. A web server may be used to accept rules definitions, receive posted positional data from connected devices, and initiate the actions specified by the satisfied rules. Alternatively, user devices may be programmed to perform one or more of these functions.

The present invention may be used to provide programmable functions by monitoring the relative locations of Bluetooth enabled or RFID tagged items that can be detected at short range to provide special electronic article surveillance functions to prevent shoplifting and theft, or to existing augment warehousing and inventory control systems, article processing and inspection systems, and the like. The Bluetooth enabled devices and the RFID tag readers are each coupled to a communications network, which may include the Internet, whereby position and identification information is passed to a processor which processes the supplied information in accordance with the previously defined rules. Some of the nodes of the network may act as relay stations, transferring device position and identification information from other nodes, or transmitting messages whose content and destination is specified by the action part of a rule whose conditions part has been satisfied.

When someone carries goods that have not been paid for into the vicinity of the doors of store and thereby satisfies the condition part of a first rule, a first alert message might be transmitted to a security guard. When the bearer of unpaid for goods attempts to actually pass through the door, a audible alarm can be issued and the door might be temporarily locked so that the theft could be intercepted. To achieve this result, the stores inventory control system database would contain data for each tagged article indicating whether that item had been sold; consequently, product identification data (e.g. an EPC code) picked up by tag readers at or near the exits from the store could be matched against the database to identify unsold articles. Alternatively, the RFID tags on the products could be disabled at the time of checkout so that only unsold items would trigger alerts and alarms at the exits.

In addition, items taken into unauthorized areas could be controlled in both a retail and business setting. Most stores and businesses issue ID cards, badges or other identification tokens to employees and visitors. If these identification cards are RFID enabled, they can be used not only in their traditional roles to provide employee identification and door card access, but the position of these identification cards (and hence the location of the bearer of the card) can automatically monitor the joint movement of the card bearer and other devices. Thus, rules can be written that would permit an executive to carry a company laptop out of the office during work hours, but issue an alarm if the same person attempted to remove the same enabled laptop on a weekend. A similar rule could be created to prevent a janitor from taking an valuable tagged property from the building. Designated tagged articles might also trigger alarms whenever they are carried into a restricted location, such as a store bathroom or a pathway toward and exit door, unless they are accompanied by the bearer of an RFID badge or card having assigned privileges. An alert message can be generated when an identified person leaves with designated objects, but does not possess the designated object or objects on their return, and message to appropriate supervisory personnel may be issued if the designated objects are not returned within a designated time. Similarly, an alarm can be generated when a worker of a particular class leaves the premises without carrying particular items; for example, repair technicians should be carrying a predetermined set of tools, and sales personnel should be reminded if they don't have their cellular phone. These employees may create their own rules to issue reminder alerts to help insure that they are properly equipped when they leave the premises.

Tagged carts or containers may be used to carry tagged goods into restricted areas or out of the store. Alarms would be activated if restricted tagged goods are carried through an entryway (in either or both directions) when they are not accompanied by the tagged cart or container. The use of these carts or containers may be restricted to authorized personnel and the restriction enforced by issuing an alert if the cart or container is not accompanied by an authorized person when it passes near a tag reader.

The location of carts and containers (such as shopping baskets) which customers use while in the store may be monitored, along with the placement of goods in the cart or container by the shopper. In addition to rules which would detect unauthorized movement of the carts, containers or goods by such customers, the system could also monitor the movement and selections made by the customers to obtain useful data such as: what routes through the store are most used by customers in general, or customers who purchase particular products; which products were purchased by customers who moved directly to product location from the entryway; which products are most frequently placed in a cart or container after a given product; and so on. The rules-based system may be used to insure that a hospital cart carries designated equipment or supplies, and an on-cart display may be used to notify personnel using the cart when a deficiency is detected.

The range and absolute position data from the network of electronic devices may be advantageously stored in a relational database and manipulated using standard query services and procedures. These query services process location data which may specify the geographic "point" position of fixed objects (without absolute position sensing means) and movable object which use GPS or MPS mechanisms to determine current position. When precise data is unavailable, objects' positions may be approximated by specifying defined regions which contain the objects. Preferably, this location data is stored in a standard format, such as that used by the locator feature in Oracle8i interMedia, a component of the Oracle 8i database available from Oracle Corporation, Redwood Shores, Calif. This locator feature, and Oracle Spatial, and its extensions used with the Oracle8i Enterprise Edition product, provides an integrated set of functions and procedures that enables spatial data to be stored, accessed, and analyzed quickly and efficiently in an Oracle8i database. Oracle Spatial provides a SQL schema and functions that facilitate the storage, retrieval, update, and query of collections of spatial features in an Oracle8i database, and includes the following components:

a. A schema that prescribes the storage, syntax, and semantics of supported geometric data types;
 b. A spatial indexing mechanism;
 c. A set of operators and functions for performing area-of-interest and spatial join queries; and
 c. Administrative utilities.

For more detailed information, see "Oracle8i interMedia Audio, Image, and Video User's Guide and Reference." Release 8.1.,5 Oracle Corporation (Oracle Part No. A67299-01), 1999, and Oracle Spatial User's Guide and Reference, Release 8.1.6, (Oracle Part No. A77132-01), 1997, 1999.

Rules Definitions

The supervisory program executing on the server 230 can further accept rules definition from a user. For example, using a conventional forms based HTML/CGI interface, the user may specify the conditions which are to be satisfied before certain actions may be taken.

By way of example, the user may define rules with the goal of making sure a user does not forget to take certain devices with their person. These devices or things that people commonly carry with them and that have some value include a Palm Pilot, cell phone, wallet, keys, pocketbook, briefcase, and portable computer. Each of these items would be equipped with a Bluetooth chip. In addition, Blue Tooth chips could be integrated into a small device (here called a "badge") whose prime function is to indicate position and which can be could placed on or near stationary devices, such as the Palm docking station, or the cell phone recharger, with which Bluetooth devices or things bearing other Bluetooth badges could link to at times.

The "web of rules" of rules defined by the user could detect and inform the user of a rich variety of events. For instance, if the user's electronic watch was in proximity to her car during the day on Monday through Friday, then the user's cell phone and briefcase should also be in proximity to the car. That is, the cell phone and briefcase should be with the user when she is traveling, and the location of the watch signifies the location of the user. Thus, the user can define a rule which states that, if the watch is within the range of the car during business hours on Monday through Friday, and further if either the cell phone or the briefcase are not in the vicinity of the car at that time, the user should be alerted in of a variety of user-defined ways as described later.

As a further example, the user could establish the rule that if the user left the house (as determined by being out of range of the particular fixed device), and a house security system indicated that the doors were not locked, and if no other user was still present in the house, the departing user would be alerted.

The action taken when a give rule is satisfied can take numerous forms. In the foregoing example, the user can be notified by a actuating a suitable alarm on a device known to be with the user (e.g., by causing her watch it sound an audible alarm or to vibrate.). Other actions can be taken when a condition is satisfied. For example, when the user enters the car for the first time when the state information indicates a different person had formerly used the car, the cars seats could be automatically adjusted for the new driver. As another example, when the system indicated that the user had left her house or her office at particular times of day, the telephone system could be programmed to automatically start call forwarding calls to a different location, or to automatically select a different greeting message that callers would hear when the calls were unanswered.

The supervisory program executing on the server (seen at 101 in FIG. 1 and at 230 in FIG. 2) could also currently report the position of articles. Thus, if the user had neglected bring her car keys, she could consult a display on her cell phone provided from the server using via the PDAs WAP interface, which might inform her that her keys (and its Bluetooth car lock control) were within range of the television set (with its Bluetooth remote control) her bedroom.

Figure 3:
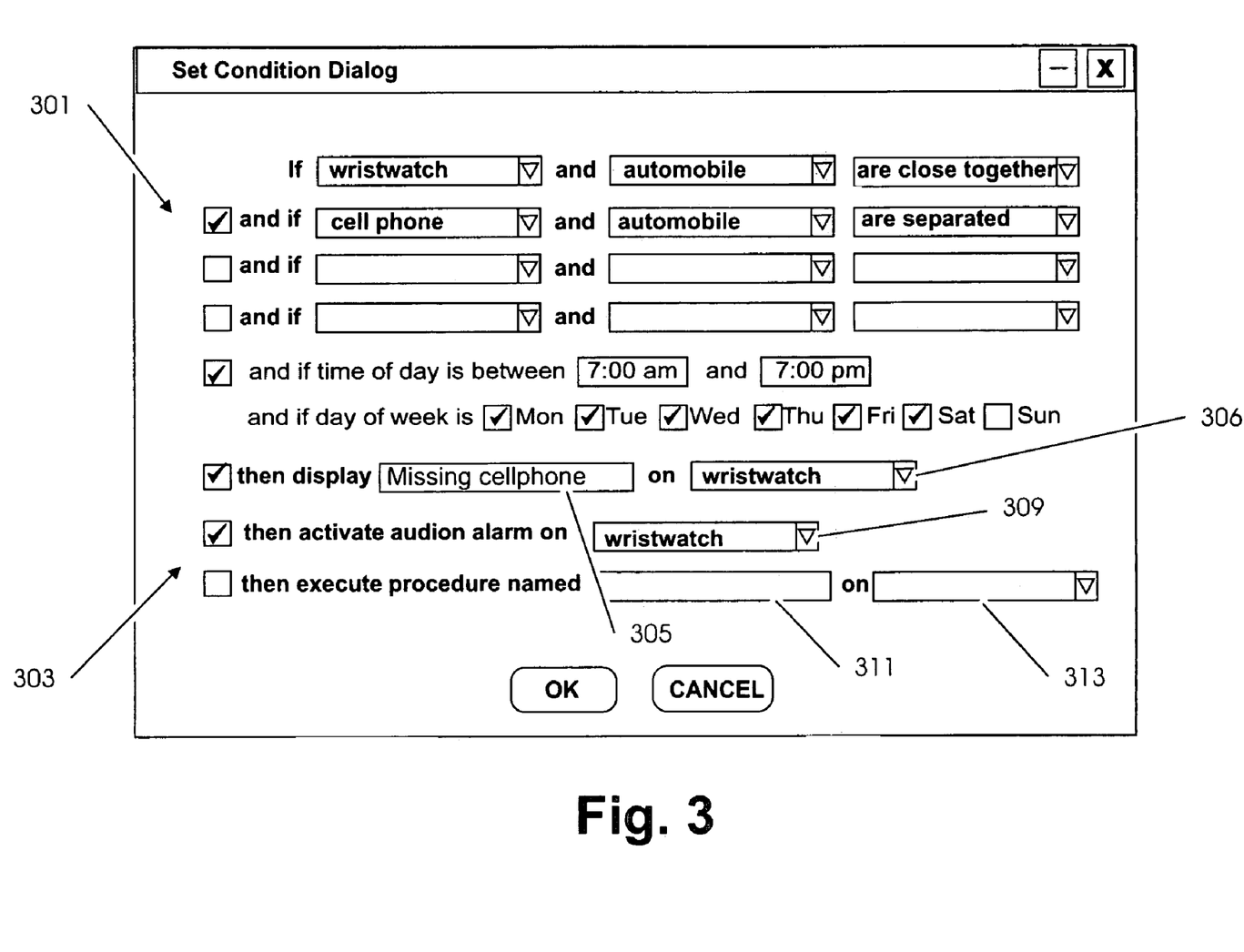
FIG. 3 depicts the screen layout of a user interface dialog box used to define one or more of the rules used to control the operation of the system.

The rules can be defined by the user using an HTML forms-based interface on a Web server, or by running a program for accepting rules on one of the user's electronic devices, such as a personal computer. An example rule definition form is shown in FIG. 3. Each rule consists of up to four positional conditions as indicated generally at 301, each of which specifies two devices and each of which states whether that particular positional condition is satisfied when those two devices (1) are close together; (2) a not close together, (3) have moved together, or (4) have moved apart. The first two possibilities can be determined by either of the devices issuing an inquiry to identify other electronic devices which are within its range, and the second two possibilities can be determined by comparing the current state of one of the devices with its prior state to determine which, if any, other devices have moved with range or have move out of range between states. In addition, the dialog form seen in FIG. 3 allows the user to state the time of day and the days of the week when the conditional test is to be performed.

As seen in FIG. 3, the illustrative HTML form further defines an action part at 303 which specifies functions to be performed when all of the conditions in the condition part of the rule are satisfied. The user can enter the text of a message to be displayed at 305 and specify the electronic device which is to display the message at 306; the user can sound an audible alarm on a device specified at 309; and/or the user can designated a named procedure at 311 to be performed on a programmable device identified at 313.

Conclusion

It is to be understood that the methods and apparatus which have been described above are merely illustrative applications of the principles of the invention. Numerous modifications may be made by those skilled in the are without departing from the true spirit and scope of the invention.

What is claimed is:

1. The method for performing one or more specified functions in response to the changing relative positions of a plurality of objects, said method comprising, in combination, the steps of:
    combining each of said objects with an electronic device that can be detected at short range to permit the position and the unique identity of said device to be determined from a distance,
    programming a first computer to accept one or more rules from a user, each of said rules containing a condition part and an action part, said condition part defining at least one relative position condition to be satisfied by specified ones of said objects and each action part defining at least one specified action to be performed when said condition part is satisfied,
    receiving position and identification data providing relative position and identification information for said specified ones of said objects,
    processing said position and identification data in accordance with said rules using said first computer, and
    performing the functions defined in the action part of each of said rules whose condition part is satisfied by said position and identification data.

2. The method for performing one or more specified functions in response to the changing relative positions of a plurality of objects as set forth in claim 1 wherein said action part further specifies the content of a message to be delivered when said condition part is satisfied.

3. The method for performing one or more specified functions in response to the changing relative positions of a plurality of objects as set forth in claim 2 wherein said action part further specifies a destination for said message.

4. The method for performing one or more specified functions in response to the changing relative positions of a plurality of objects as set forth in claim 1 wherein said position and identification data is provided at least in part by an interrogation device capable of remotely identifying those electronic devices that are within a predetermined range of said interrogation device and wherein each of said electronic devices delivers a unique identification value to said interrogation device in response to an inquiry from said interrogation device.

5. The method for performing one or more specified functions in response to the changing relative positions of a plurality of objects as set forth in claim 4 wherein at least one of said said interrogation devices is a Bluetooth compliant integrated circuit.

6. The method for performing one or more specified functions in response to the changing relative positions of a plurality of objects as set forth in claim 4 wherein at least some of said electronic devices are radio frequency identification tags and wherein said interrogation device is an identification tag reader capable of remotely identifying identification tags within a predetermined range of said tag reader.

7. The method for performing one or more specified functions in response to the changing relative positions of a plurality of objects as set forth in claim 4 wherein at least a given one of said electronic devices includes a global positioning system device capable of producing data indicating the absolute position of said given one of said electronic devices.

8. The method for performing one or more specified functions in response to the changing relative positions of a plurality of objects as set forth in claim 1 wherein said first computer is a Web server computer connected to accept said one or more rules from a user via the Internet.

9. The method for performing one or more specified functions in response to the changing relative positions of a plurality of objects as set forth in claim 1 wherein said condition part further specifies a time of day condition which must also be satisfied when said relative position condition is satisfied.

10. The method for performing one or more specified functions in response to the changing relative positions of a plurality of objects as set forth in claim 1 wherein said action part specifies a named procedure to be performed on a target computer when said condition part is satisfied.

11. The method for performing one or more specified functions in response to the changing relative positions of a plurality of objects as set forth in claim 10 wherein said action part further identifies said target computer.

12. The method for performing one or more specified functions in response to the changing relative positions of a plurality of objects as set forth in claim 1 wherein at least one of said objects is a container for others of said objects and wherein said condition part defines at least one relative position condition to be satisfied by the position of said container relative to one or more specified objects.

13. The method for performing one or more specified functions in response to the changing relative positions of a plurality of objects as set forth in claim 1 wherein at least one of said objects is an identification token issued to a designated bearer and wherein said condition part defines at least one relative position condition to be satisfied by the position of said identification token relative to one or more specified objects.

14. Apparatus for performing one or more specified functions in response to the changing relative positions of a plurality of objects, said apparatus comprising, in combination:
    an electronic device that can be identified at short range attached to or forming a part of each of said plurality of objects, said electronic device including means for storing and transmitting a unique assigned identification value upon request,
    first input means for accepting one or more rules from a user, each of said rules containing a condition part and an action part, said condition part defining at least one relative position condition to be satisfied by specified ones of said objects and each action part defining at least one specified action to be performed when said condition part is satisfied,
    detection means for generating position and identification data providing relative position information and the unique assigned identification value for specific identified ones of said electronic devices,
    a processor for processing said position and identification data in accordance with said rules, and
    performing the functions defined in the action part of each of said rules whose condition part is satisfied by said position and identification data.

15. Apparatus for performing one or more specified functions in response to the changing relative positions of a plurality of objects as set forth in claim 14 wherein said detection means includes an interrogation device capable of determining whether said specific identified ones of said objects are within a predetermined range of said interrogation device.

16. Apparatus for performing one or more specified functions in response to the changing relative positions of a plurality of objects as set forth in claim 15 wherein said interrogation device is a Bluetooth compliant integrated circuit.

17. Apparatus for performing one or more specified functions in response to the changing relative positions of a plurality of objects as set forth in claim 15 wherein said specified ones of said electronic devices are radio frequency identification tags and wherein said interrogation device is an identification tag reader capable of detecting the presence of said identification tags within a predetermined range of said tag reader.

18. Apparatus for performing one or more specified functions in response to the changing relative positions of a plurality of objects as set forth in claim 15 wherein at least a given one of said electronic devices includes a global positioning system device capable of producing data indicating the identify and absolute position of said given one of said electronic devices.

19. Apparatus for performing one or more specified functions in response to the changing relative positions of a plurality of objects as set forth in claim 14 wherein said action part further specifies the content and destination of a message to be delivered when said condition part is satisfied.

20. Apparatus for performing one or more specified functions in response to the changing relative positions of a plurality of objects as set forth in claim 14 wherein at least one of said objects is a container for one or more specified objects and wherein said condition part defines at least one relative position condition to be satisfied by the position of said container relative to said one or more specified objects.

21. Apparatus for performing one or more specified functions in response to the changing relative positions of a plurality of objects as set forth in claim 14 wherein at least one of said electronic devices is an identification token issued to a designated bearer and wherein said condition part defines at least one relative position condition to be satisfied by the position of said identification token relative to one or more of other electronic devices.

* * * * *